Figure 5:
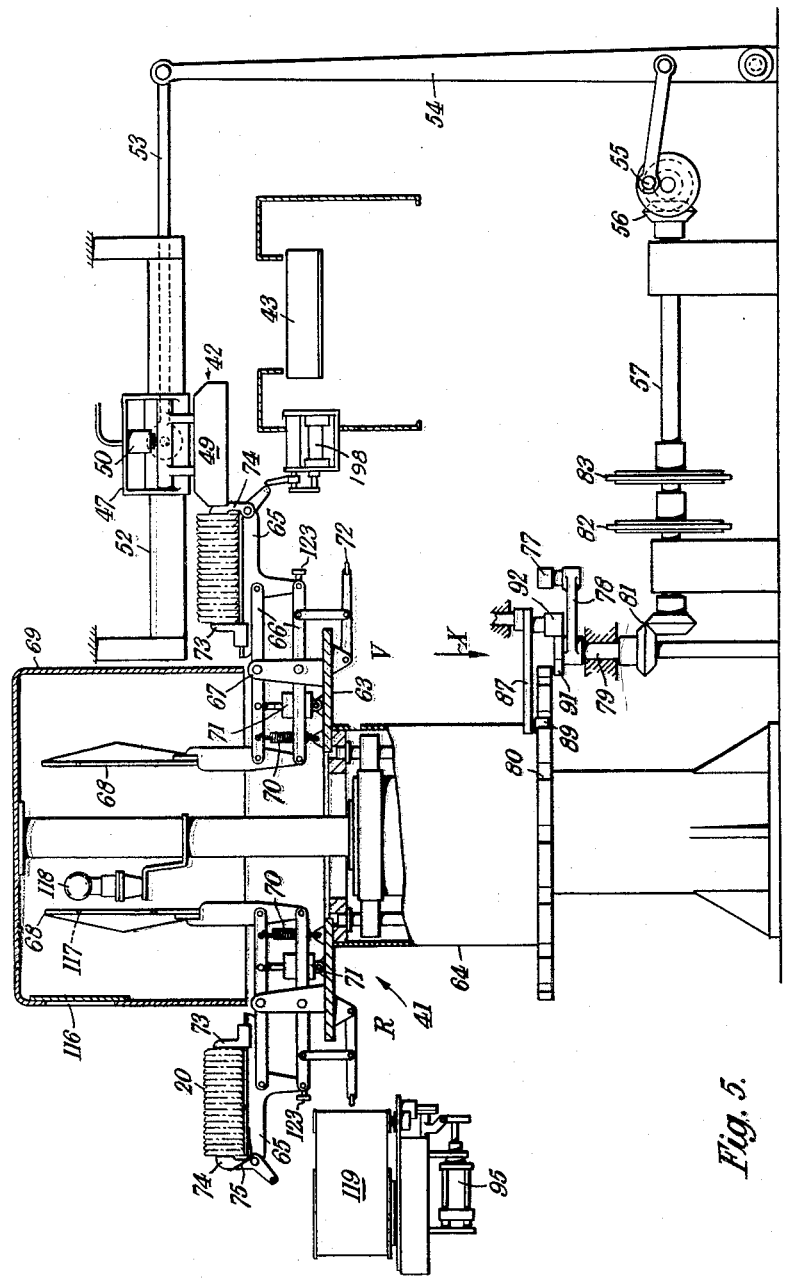

Aug. 15, 1961 P. J. PACKMAN 2,996,198
MEANS FOR HANDLING FLAT ARTICLES
Filed June 4, 1959 4 Sheets-Sheet 1
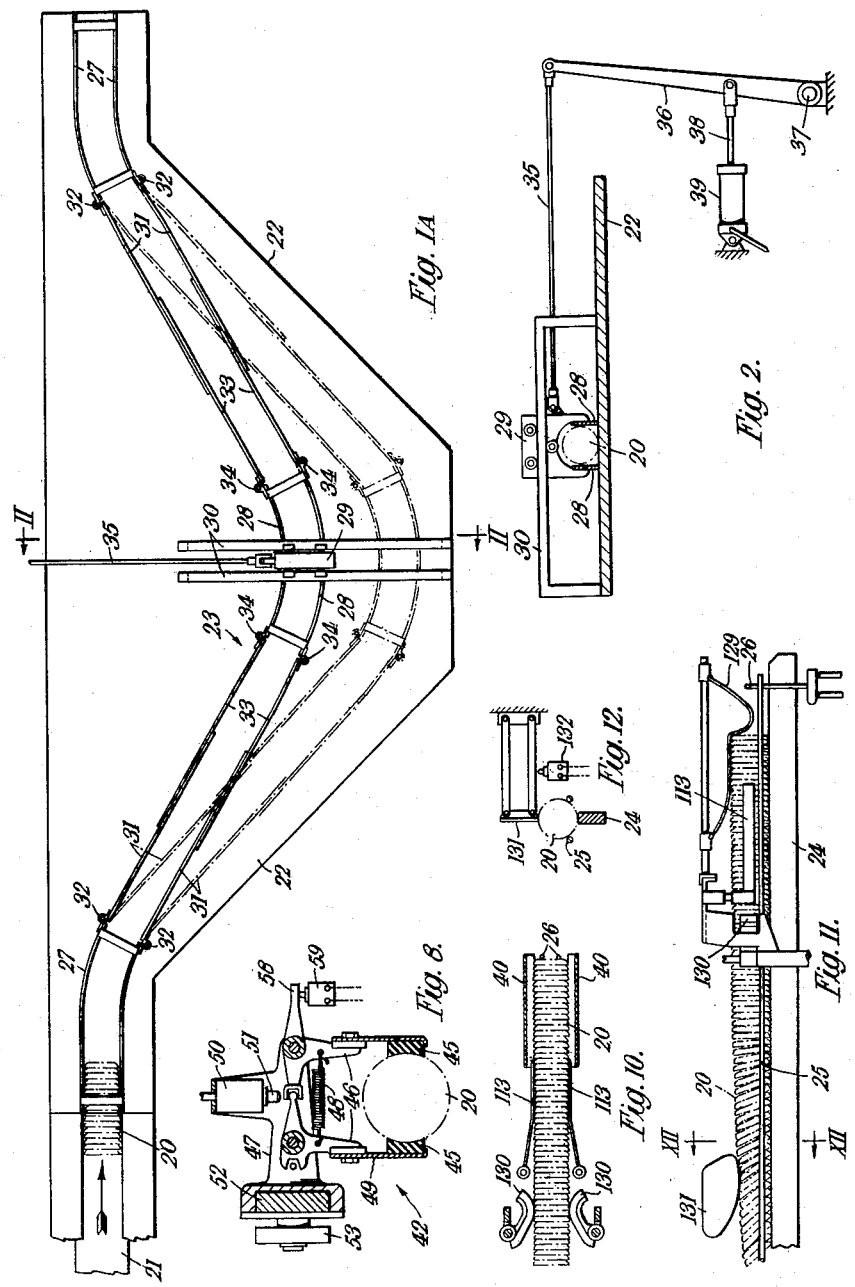
INVENTOR
Percival James Packman
By Watson, Cole, Grindle & Watson

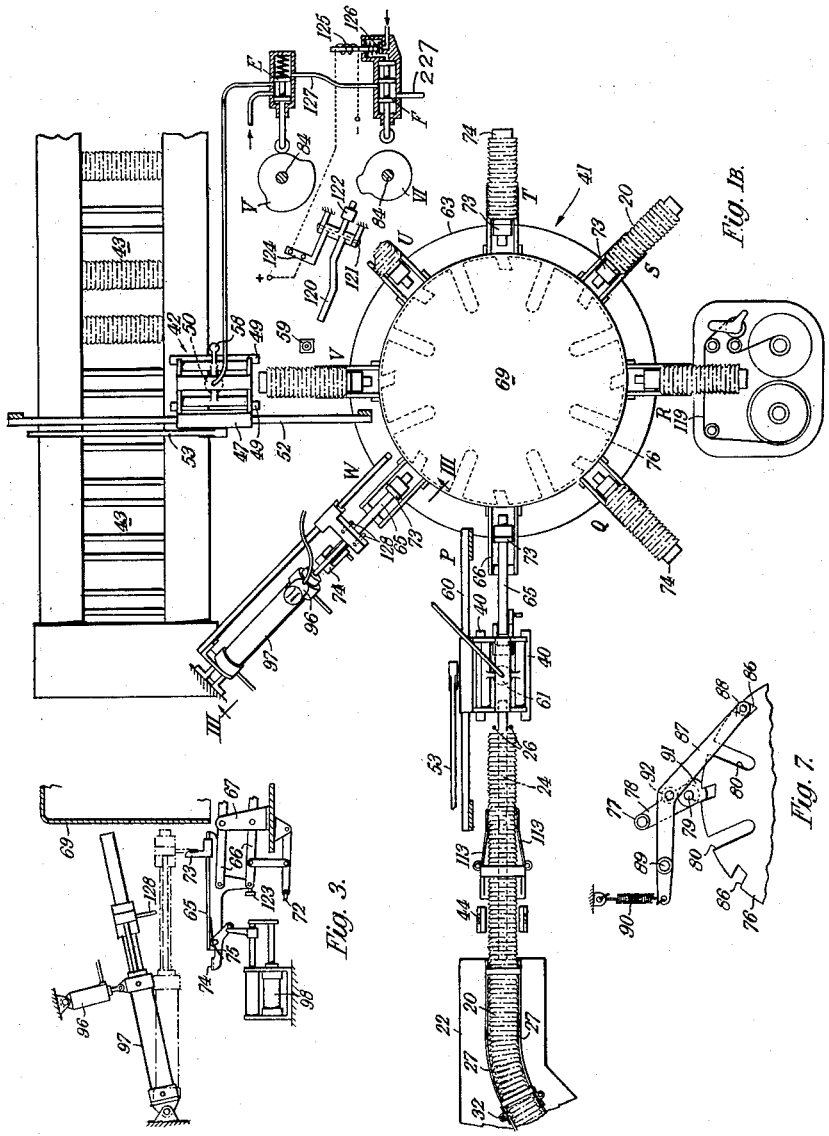

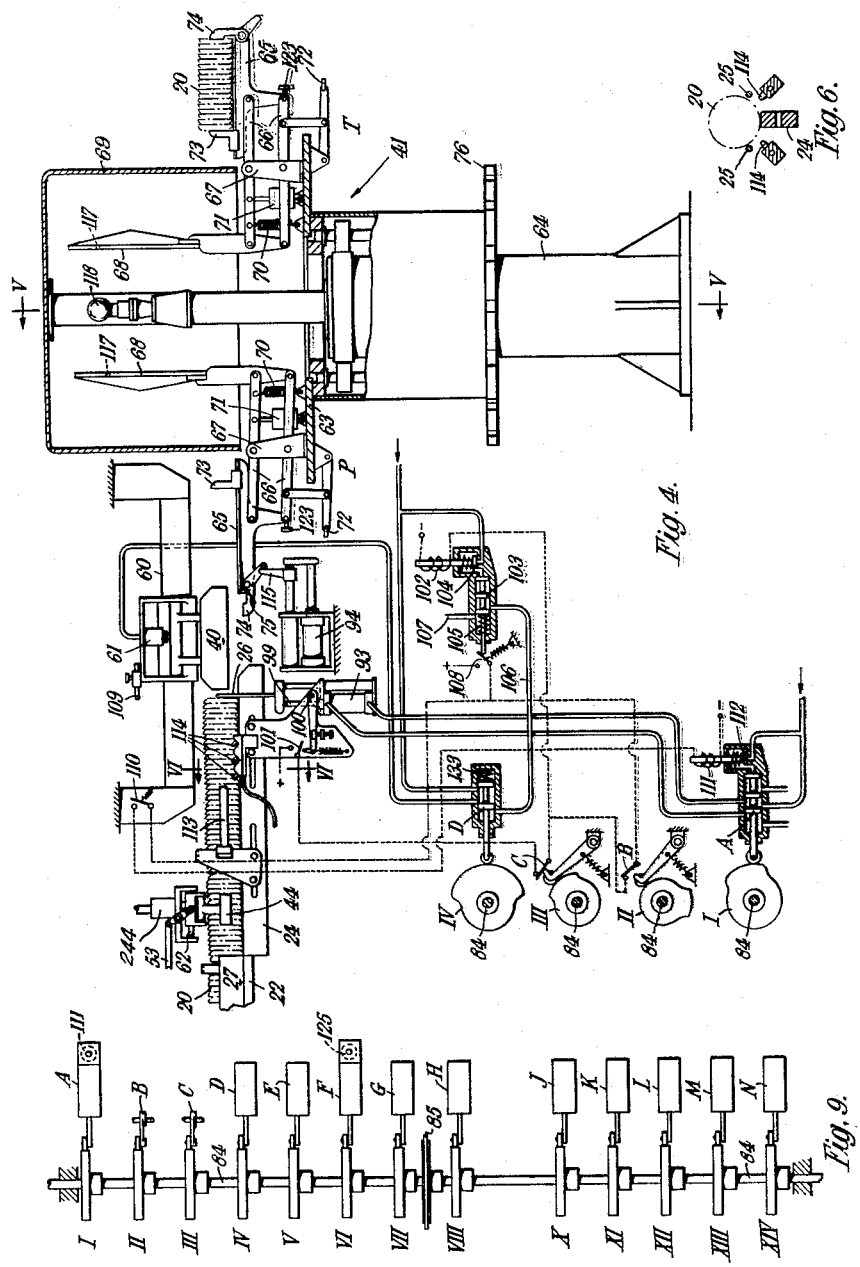

United States Patent Office 2,996,198
Patented Aug. 15, 1961

2,996,198
MEANS FOR HANDLING FLAT ARTICLES
Percival James Packman, Twyford, England, assignor to The Forgrove Machinery Company Limited, Leeds, England, a company of Great Britain
Filed June 4, 1959, Ser. No. 818,150
5 Claims. (Cl. 214—1)

This invention relates to apparatus for removing, for the purpose of further handling, e.g. tray filling, weighing or packaging, batches of biscuits or like flat articles, hereinafter referred to as biscuits, from the head of an advancing column of biscuits stacked on edge.

The apparatus according to the invention comprises a stop for arresting the leading end of the column, gripping jaws arranged to move periodically from a measuring station to a delivery station and means for closing the gripping jaws at the measuring station, so that they may engage a measured length of the arrested biscuits at the leading end of the column and transfer the engaged batch to the delivery station, and opening the gripping jaws on their arrival at the delivery station.

Preferably the column of biscuits is advanced towards the stop along a stationary platform to which it is delivered by a continuously moving infeed conveyor. Preferably, also, the gripping jaws are mounted on a carriage mounted to reciprocate in the lengthwise direction of the column and means are provided for periodically withdrawing the stop, when the gripping jaws have engaged a batch of biscuits, to permit of transfer of the engaged batch to the delivery station.

The batches of biscuits may be discharged from the gripping jaws at the delivery station into trays or into pockets of an infeed conveyor leading to a wrapping machine. Alternatively, they may be discharged into a weighing apparatus of the kind described in copending U.S. application No. 812,732; now abandoned.

Two alternative embodiments of the invention will now be described in detail, by way of example, with reference to the accompanying drawings, in which:

FIGS. 1A and 1B collectively constitute a plan view of the first embodiment of the invention, FIG. 2 is a section on the line II—II in FIG. 1A, FIG. 3 is a section on the line III—III in FIG. 1B, FIG. 4 is a side elevation, partly in section, showing the parts illustrated in FIG. 1B and also showing diagrammatically part of the pneumatic control system, FIGS. 5 and 6 are respectively sections on the lines V—V and VI—VI in FIG. 4, FIG. 7 is a detail view looking in the direction of the arrow X in FIG. 5, FIG. 8 is an end elevation of the grippers for feeding the articles from the weighing machine to the infeed conveyor of a wrapping machine, FIG. 9 shows, diagrammatically, the cam shaft of the machine, FIG. 10 is a diagrammatic plan view of the second embodiment, FIG. 11 is a corresponding side elevation, and FIG. 12 is a section on the line XII—XII in FIG. 11.

Like reference numerals indicate like parts throughout the figures.

Referring first to FIG. 1A, it will be seen that a column of biscuits 20, produced for example by the apparatus described in British specification No. 801,564, is fed by a continuously moving infeed conveyor 21 on to a dead plate 22, on which is mounted a biscuit pump 23. The biscuit pump forms, per se, no part of the present invention. The biscuit pump consists of parallel guides for supporting the sides of the biscuits which form an expansible track for receiving the biscuits fed forward by the conveyor 21, the track being capable of periodic contraction to feed the biscuits forwards on to a fixed track, constituted by a bottom support 24 and side supports 25 (see particularly FIG. 6) and leading to a stop 26 (FIG. 4). The track of the pump includes fixed end sections 27, a curved centre section 28 mounted on a carriage 29 movable transversely to the track on guides 30, intermediate sections 31 pivoted at 32 to the end sections 27, and intermediate sections 33 pivoted to 34 to the centre section 28. As shown the sections 33 engage telescopically with the sections 31. The carriage 29 is coupled by a rod 35 to the upper end of a lever 36 (FIG. 2) mounted at its lower end on a fixed pivot 37 and connected intermediately of its length to a rod 38 coupled to a piston contained in a pneumatic cylinder 39. When air is exhausted from the cylinder 39, the biscuits fed on to the dead plate 22 by the conveyor 21 cause the tracks to bulge from the configuration shown in full lines in FIG. 1A to that shown in chain dotted lines. Periodically, however, air under pressure is admitted to the cylinder 39, as later described, causing the lever 36 to move clockwise as seen in FIG. 2 and cause the track to contract to pump biscuits on to the track 24, 25 leading to the stop 26.

Batches of biscuits are transferred in succession, as later described, by grippers 40 (FIG. 1B) from the head of the column to the scale pans of a weighing machine 41. After weighing, the batches of biscuits are transferred by further grippers 42 to the pockets of the infeed conveyor 43 which carries the batches of biscuits to a wrapping machine. Another pair of grippers 44 operates periodically to retract the biscuits on the track 24, 25 as later described. As shown in FIG. 8, the grippers 42 are constituted by rubber pads 45 for engaging the sides of the biscuits which are supported by jaws 49 on interengaging bell crank levers 46 pivoted to a carriage 47 and normally held closed by a spring 48. When, however, air under pressure is admitted to a pneumatic cylinder 50, a rod 51 is projected from the cylinder, so moving the bell cranks against their spring to cause the jaws 49 to open. The carriage 47 is periodically reciprocated along a guide bar 52 by a link 53 (FIG. 5) deriving its motion from a lever 54 oscillated by a crank 55 driven, through bevel gearing 56, from the main drive shaft 57 of the machine. One of the bell cranks 46 (FIG. 8) has an extension 58 arranged to coact, for a purpose later described, with a microswitch 59.

The grippers 40 and 44 are of similar construction to the grippers 42 (except that their bell cranks have no extension such as 58) and need not therefore be described in detail. The grippers 40 are reciprocated along a guide bar 60 (FIG. 4) by a crank driven mechanism, similar to that associated with the grippers 42, and also driven from the main shaft 57, the gripper-reciprocating link being indicated at 53 in FIG. 1B. The pneumatic cylinder for opening the grippers 40 is shown at 61 in FIG. 4. The grippers 44 are reciprocated on a guide bar 62 by the link 53, the pneumatic cylinder associated with these grippers not being shown in FIG. 4.

The weighing machine 41 comprises an indexing head 63 mounted for intermittent rotation on a pillar 64. The indexing head carries eight identical scale pans 65. Each scale pan is mounted by a parallel linkage 66 on a supporting bracket 67 on the head 63, the linkage carrying at its inner end a screen 68 situated inside a hood 69. Each linkage has an associated spring 70, air dashpot 71 and ball pointed pen 72. Each scale pan includes a fixed inner jaw 73 and a pivoted outer jaw 74 which is normally urged inwards by a spring 75 (FIG. 4) to grip the biscuits contained in the scale pan.

Attached to the indexing head 63 is a Geneva wheel 76, which is periodically rotated by engagement of a pin 77 (FIG. 7) on an arm 78 carried by a shaft 79 with one of the notches 80 in the wheel. The shaft 79 is driven by bevel gearing 81 from the main shaft 57, which in turn is driven by an electric motor (not shown) through the agency of a chain sprocket 82. Another sprocket 83 on the shaft 57 serves to drive the mechanism for reciprocating the grippers 40 and 44 and also a cam shaft 84 shown diagrammatically in FIG. 9. The sprocket driving the cam shaft is indicated at 85 in FIG. 9. During the periods of dwell of the Geneva wheel 76, it is locked against rotation by engagement with notches 86 therein of a roller 88 on a lever 87, pivoted at 89 (FIG. 7) and urged towards the locking position by a spring 90. Periodically a cam 91 on the shaft 79 engages a roller 92 on the lever 87 and rocks the latter so as to free the roller 88 from the Geneva wheel.

As indicated in FIG. 9, the cam shaft 84 carries 13 cams I–VIII and X–XIV, which perform the following functions.

Cam I coacts with a solenoid controlled valve A for controlling admission of air to an air cylinder 93 (FIG. 4) associated with the stop 26, Cam II coacts with a switch B, FIG. 4, Cam III coacts with a switch C, Cam IV coacts with a valve D controlling the admission of air to the cylinder 61 of the grippers 40, Cam V coacts with a valve E (FIG. 1B) controlling the admission of air to the cylinder 50 of the grippers 42, Cam VI coacts with a solenoid operated valve F, Cam VII coacts with a valve G controlling a pneumatic cylinder 94 (FIG. 4) at the station at which biscuits are loaded into the weighing machine, Cam VIII coacts with a valve H controlling a similar pneumatic cylinder 98 (FIG. 3) at the reject station (described later) of the weighing machine, Cam X coacts with a valve J controlling the pneumatic cylinder 244 of the grippers 44, Cam XI coacts with a valve K controlling the pneumatic cylinder 39 of the biscuit pump, Cam XII coacts with a valve L controlling the pneumatic cylinder 95 (FIG. 5) of the printing mechanism associated with the weighing machine, Cam XIII coacts with a valve M controlling a pneumatic cylinder 96 (FIG. 3), Cam XIV coacts with a valve N controlling a pneumatic cylinder 97 (FIG. 1B).

The operation of the machine will now be described, starting from the position of the parts shown in FIG. 4 in which the head of the column of biscuits is approaching the stop 26 and the grippers 40 are returning towards the biscuits from position above one of the scale pans. When the biscuits meet the stop 26, which is constituted as shown in FIG. 1B by a pair of prongs upstanding from the piston rod 99 in the cylinder 93, the cylinder 93 is rocked clockwise about a pivot 100 so closing a switch 101. Provided the grippers 40, which will be open as the valve D is supplying compressed air to the cylinder 61, are in a position on their return stroke such that the switch C is closed by the cam III, closure of the switch 101 completes a circuit, through switch C, to energize the solenoid 102 of a valve 103, so opening a valve 104 and admitting air to the casing of the valve 103, causing the latter to move from the position shown, against a spring 105, to connect a line 106 to an exhaust outlet 107. In so moving the valve 103 closes a switch 108 to complete a holding circuit through switch B for the solenoid 102. Consequently the solenoid remains energized when the switch C is opened by the cam III prior to arrival of the grippers 40 into position to pick up a batch of biscuits from the column.

Before the grippers 40 reach the pick up position, the grippers 44 are caused by the cam X to close on the biscuits and they are then moved rearwardly to retract the biscuits in rear of them and so relieve the pressure on the stop 26. As soon, however, as the grippers 40 reach the pick up position, a striker 109 on the gripper carriage closes a switch 110. This establishes a circuit to a solenoid 111, so opening a valve 112 and causing the valve A, which is now clear of the cam I, to move to its alternative position, thereby admitting air under pressure to the upper end of the cylinder 93 to cause the stop 26 to be retracted. On arrival of the grippers 40 at the pick up position the cam IV allows the valve D to move, under the action of its spring 133, so connecting the cylinder 61 of the grippers 40 to the line 106, which has already been connected to atmosphere by movement of the valve 103 as already described. The grippers 40 accordingly close on the biscuits. In doing so they press inwardly against the sides of the column of biscuits a pair of spring metering fingers 113 (FIG. 1B) to shield the biscuits immediately behind the batch to be transferred and prevent them from being picked up by the grippers.

As soon as the grippers 40 have closed on the batch of biscuits they accelerate away from the column of biscuits. Cam X then causes the grippers 44 to release the biscuits and these grippers return to their forward position, and immediately after this the cam XI supplies air to the cylinder 39 of the biscuit pump and the biscuits are pumped forward towards the stop 26. During their forward travel they are prevented from toppling forwards by air jets 114 (FIGS. 4 and 6). Air is again cut off from the cylinder 39 shortly after the biscuits have again reached the stop.

When the grippers 40 move away from the switch 110, the solenoid 111 of the valve A is de-energized and as soon as the biscuits withdrawn by the grippers 40 are clear of the stop 26 the cam I shifts the valve A back to a position shown, compressed air being admitted to the lower end of the cylinder 93 so returning the stop 26 to operative position. During the travel of grippers to their discharge position, the cam II opens the switch B, so de-energizing the solenoid 102 of the valve 103 which returns to its initial position and opens the switch 108.

When the grippers 40 reach the extreme limit of their travel and are positioned above one of the scale pans of the weighing machine, the cam IV returns the valve D to its initial position and admits compressed air to the cylinder 61, thereby causing the grippers to open and deposit the batch of biscuits in the scale pan. Prior to deposition of the biscuits, the cam VII causes air to be admitted to the cylinder 94, FIG. 4, so causing a nose 115 on its piston rod to coact with the jaw 74 of the scale pan, opening it as shown. Air is exhausted from the cylinder 94 immediately after the biscuits have been deposited on the scale pan, so allowing the jaw 74 to return to position to engage the biscuits.

The grippers 40 withdraw the biscuits from the column at a slightly greater rate than that at which they are fed forward by the biscuit pump. Accordingly, from time to time the head of the column of biscuits will not contact the stop 26 and cause the switch 101 to close until a time so late in the cycle that the cam III has already allowed the switch C to open. In such event the closure of switch 101 will be ineffective to energize the solenoid 102 and shift the valve 103. Accordingly, when the cam IV shifts the valve D on arrival of the grippers 40 at the pick up position, no exhaust connection for the cylinder 61 is provided by the valves D and 103 and the grippers are unable to close. They consequently perform an idle stroke. Of course the grippers necessarily perform an idle stroke if the biscuits are not fed forward sufficiently to displace the stop and close the switch 101 before the grippers arrive at the pick up position. Since the switch 108 can only be closed as the result of closure of the switch 101 while the switch C is closed and the solenoid 111 cannot be energized unless switch 108 is closed, the stop 26 will not be removed when the grippers 40 fail to close at the pick up position.

The weighing machine 41 indexes the batches of biscuits from the loading station P (FIG. 1B) to stations Q, R, S, T, U, V and W. At station Q the scale pans may be lightly tamped if desired. At station R a visual record of the weight of the batch is provided on a scale engraved on a window 116, FIG. 5, in the hood by reason of a horizontal slot 117 in the screen 68 being brought into position between the window and an electric lamp 118 having a horizontal filament. Compressed air is at the same time admitted by the cam XII to the cylinder 95 causing, as described in detail in my U.S. application Serial No. 812,732, filed May 12, 1959 now abandoned, a web of record paper 119 to be advanced one step and the web to be thereafter pressed against the ball point pen 72 dwelling at station R. The weight of each batch of biscuits is thus recorded in turn on the web 119.

Visual weighing can be performed also at station S and the printed record of the weight can be made at station T instead of at R. U is an idle station. Between stations U and V, the scale pan passes a detector leaf 120, pivoted at 121 and counterbalanced by a weight 122. Normally a roller 123 (FIGS. 4 and 5) on the scale pan passes below the leaf 120. If the batch of biscuits is unduly light, however, the roller 123 lifts the detector leaf 120 and causes it to close a switch 124 (FIG. 1B) and energize the solenoid 125 of the valve F, so opening a valve 126 and admitting compressed air to the right hand end of the casing of the valve F and causing the latter to move to the left to cut off from an exhaust connection 227 a pipe 127 leading from the valve E.

When the scale pan reaches the discharge station V, cam V shifts the valve E to its alternative position. Unless the detector leaf 120 has been displaced, air is exhausted from the cylinder 50 of the grippers 42 which close to grip the batch of biscuits in the scale pan. In doing so they actuate the switch 59 (FIG. 8) to energize the solenoid of the valve associated with pneumatic cylinder 198, FIG. 5 (similar to the cylinder 98), for opening the jaw 74 of the scale pan at the discharge station. The grippers 42 accordingly transfer the biscuits to position above the infeed conveyor 43, whereupon the cam V shifts the valve E to open the grippers again and drop the biscuits into the conveyor.

Here the cam VIII causes the valve H to admit air to the cylinder 98 to cause it to open the jaw 74 of the scale pan at the reject station. The pneumatic cylinders 96, 97 controlled by the cams XIV, XV, control the movement of an ejector claw 128. Prior to arrival of the scale pan at station W, the parts occupy the position shown in FIG. 3, in full lines, with the cylinder 97 in an upwardly inclined position. The cylinder 97 then moves the claw 128 inwardly and the cylinder 96 then lowers the claw 128 to the position shown in chain-dotted lines, whereafter the cylinder 97 moves the claw 128 outwardly again, to rake out of the scale pan any biscuits which it contains. The jaw 74 is then returned to its normal position.

It will be appreciated that the stop 26, or the metering plates 113, or both, can be adjusted in a direction lengthwise of the column to permit of variation in the length of the transferred batches of biscuits. In such a case corresponding adjustment is, of course, made to the scale pans.

If it is not desired to weigh the batches of biscuits, the batches can of course be transferred by the grippers 40 direct to the infeed conveyor of the wrapping machine.

The modified apparatus shown in FIGS. 10–12 is generally similar to that already described. In this case the biscuits are prevented from toppling forward on their way to the stop by a depending length of chain 129 instead of by an air blast. The retracting grippers 44 are replaced by a pair of braking pads 130, which are moved inwardly against the biscuits during separation of a batch of biscuits by the grippers 40. No biscuit pump is used, the biscuits being fed towards the stop solely by pressure of those behind them. Alternatively, the support 24 may slope upwardly towards the stop 26 to assist in maintaining the biscuits erect.

In the event of the biscuit supply being inadequate, the biscuits behind the brake pads 130 will tend to fall rearwardly as shown in FIG. 11. A feeler pad 131 is supported by a linkage so that it rests on top of the biscuits. If the pad 131 falls below a given level it actuates a switch 132, thereby preventing the grippers from closing on the biscuits until such time as the pressure of oncoming biscuits has lifted the pad 131 clear of the switch.

No claim is made herein, as such, to the weighing machine which is claimed in copending British application No. 1657/58.

What I claim as my invention and desire to secure by Letters Patent is:

1. Apparatus for transferring in succession to a delivery station batches of biscuits from the head of an advancing column of biscuits comprising a stationary platform, a stop for arresting the leading end of the column of biscuits, means for advancing said column along said platform to said stop, a carriage mounted to reciprocate in the lengthwise direction of the column, grippers mounted on said carriage and movable thereby from a measuring station to the delivery station, means for closing the grippers at the measuring station so that they may engage a measured length of the arrested biscuits at the leading end of the column and transfer the batch of engaged biscuits to the delivery station, and for thereafter opening the grippers upon their arrival at the delivery station, means for periodically withdrawing the stop, when the grippers have engaged a batch of biscuits, to permit of transfer of the engaged batch to the delivery station and a chain depending into the path of the biscuits to prevent them from falling forwards as they advance towards the stop.

2. Apparatus for transferring in succession to a delivery station batches of biscuits from the head of an advancing column of biscuits comprising a stationary platform, a stop for arresting the leading end of the column of biscuits, means for advancing said column along said platform to said stop, a carriage mounted to reciprocate in the lengthwise direction of the column, grippers mounted on said carriage and movable thereby from a measuring station to the delivery station, means for closing the grippers at the measuring station so that they may engage a measured length of the arrested biscuits at the leading end of the column and transfer the batch of engaged biscuits to the delivery station, and for thereafter opening the grippers upon their arrival at the delivery station, means for periodically withdrawing the stop, when the grippers have engaged a batch of biscuits, to permit of transfer of the engaged batch to the delivery station and means for directing an air jet against the advancing biscuits to prevent them from falling forwards during their travel to the stop.

3. Apparatus for transferring in succession to a delivery station batches of biscuits from the head of an advancing column of biscuits comprising a stationary platform, a stop for arresting the leading end of the column of biscuits, means for advancing said column along said platform to said stop, a carriage mounted to reciprocate in the lengthwise direction of the column, grippers mounted on said carriage and movable thereby from a measuring station to the delivery station, means for closing the grippers at the measuring station so that they may engage a measured length of the arrested biscuits at the leading end of the column and transfer the batch of engaged biscuits to the delivery station, and for thereafter opening the grippers upon their arrival at the delivery station, means for periodically withdrawing the stop, when the grippers have engaged a batch of biscuits, to permit of transfer of the engaged batch to the delivery station and a pair of resilient metering plates extending along opposite sides of the column of biscuits, the grippers overlapping the ends of the metering plates, when the grippers close at the measuring station, and forcing them against the column to prevent removal by the grippers of biscuits situated upstream of the ends of the metering plates.

4. Apparatus for transferring in succession to a delivery station batches of biscuits from the head of an advancing column of biscuits comprising a stationary platform, a stop for arresting the leading end of the column of biscuits, means for advancing said column along said platform to said stop, grippers for removing batches of biscuits from the head of said column, a carriage supporting said grippers and mounted to reciprocate in the lengthwise direction of the column to move said grippers periodically from a measuring station adjacent the stop to the delivery station and back again, gripper control means for closing the grippers on their arrival at the measuring station to cause them to engage a batch of biscuits and afterwards opening them at the delivery station to release said batch, means for periodically withdrawing the stop, when the grippers have closed to engage a batch of biscuits, to permit of transfer of the engaged batch to the delivery station, means controlled by said stop for preventing said gripper control means from closing the grippers whenever said grippers arrive at the measuring station prior to arrival of the head of said column at said stop, and a pair of resilient metering plates extending along opposite sides of the column of biscuits, the grippers overlapping the ends of the metering plates, when the grippers close at the measuring station, and forcing them against the column to prevent removal by the grippers of biscuits situated upstream of the ends of the metering plates.

5. Apparatus according to claim 4, comprising further grippers located opposite said column upstream of said metering plates and means for closing said grippers on the biscuits and moving them to retract said column of biscuits, when said metering plates are engaged with said column, whereby to relieve pressure of said biscuits on said stop.

References Cited in the file of this patent
UNITED STATES PATENTS

| | | |
|---|---|---|
| 1,344,034 | Hart | June 22, 1920 |
| 1,855,767 | Neuman | Apr. 26, 1932 |
| 2,598,222 | Cahners | May 27, 1952 |
| 2,696,702 | Martin | Dec. 14, 1954 |
| 2,698,693 | Nordquist | Jan. 4, 1955 |
| 2,747,352 | Whitecar | May 29, 1956 |
| 2,762,487 | Temple | Sept. 11, 1956 |
| 2,878,919 | Jones | Mar. 24, 1959 |
| 2,954,881 | Hopton et al. | Oct. 4, 1960 |

FOREIGN PATENTS

| | | |
|---|---|---|
| 216,559 | Australia | July 2, 1958 |